United States Patent [19]

Kayakabe et al.

[11] Patent Number: 4,677,021
[45] Date of Patent: Jun. 30, 1987

[54] AIR-STREAM CONTROL VALVE FOR AUTOMOTIVE AIR CONDITIONING APPARATUS AND PRODUCING METHOD THEREFOR

[75] Inventors: Hiroshi Kayakabe, Nagoya; Masaei Mitomi, Chiryu; Mikio Miyajima, Okazaki; Shuji Nakata, Oobu; Tadashi Shimizu, Nagoya; Kazuharu Yoshito, Chiryu; Masamichi Nishiu, Nagoya, all of Japan

[73] Assignees: Shimizu Industry Company Ltd.; Nippondenso Co., Ltd., both of Kariya, Japan

[21] Appl. No.: 845,133

[22] PCT Filed: Jul. 3, 1985

[86] PCT No.: PCT/JP85/00373

§ 371 Date: Mar. 10, 1986

§ 102(e) Date: Mar. 10, 1986

[87] PCT Pub. No.: WO86/00688

PCT Pub. Date: Jan. 30, 1986

[30] Foreign Application Priority Data

Jul. 11, 1984 [JP] Japan .................................. 59-143829

[51] Int. Cl.[4] .......................... B32B 1/00; B32B 7/09
[52] U.S. Cl. .................................. 428/306.6; 156/90; 181/224; 181/252; 428/316.6; 428/317.1

[58] Field of Search .................. 428/317.1, 317.7, 36, 428/188, 306.6, 308.4, 308.8, 309.9; 181/224, 252; 156/90

[56] References Cited

U.S. PATENT DOCUMENTS 4,356,642 11/1982 Herman ........................... 428/317.1
4,360,984 11/1982 Ruttenberg ..................... 428/317.1

FOREIGN PATENT DOCUMENTS 53-5365 2/1978 Japan .
54-15477 6/1979 Japan .
54-146547 10/1979 Japan .
56-140035 10/1981 Japan .

*Primary Examiner*—William J. Van Balen
*Attorney, Agent, or Firm*—Cushman, Darby & Cushman

[57] ABSTRACT

An air-flow control valve of the structure in which a soft foamed sheet (2) is joined to one or both surfaces of a valve body (1) made of a synthetic resin as a unitary structure via a sheet (3) for preventing the oozing of resin. The ooze-preventing sheet (3) is stuck with an adhesive or the like onto one surface of the soft foamed sheet (2) in advance, and a synthetic resin for forming the valve body (1) is placed on the stuck surface of the foamed sheet (2). Or, another foamed sheet (2) with its sticking surface being on the lower side is further placed thereon, followed by stamping. Therefore, the foamed sheet (2) is not peeled off, and the air-flow control valve exhibits sufficient buffer function against the rigid valve body (1).

9 Claims, 11 Drawing Figures

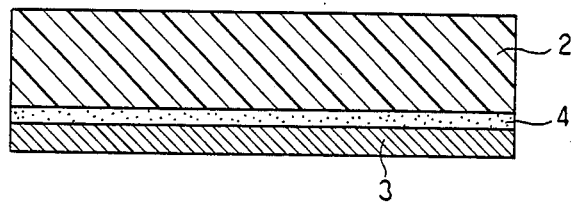
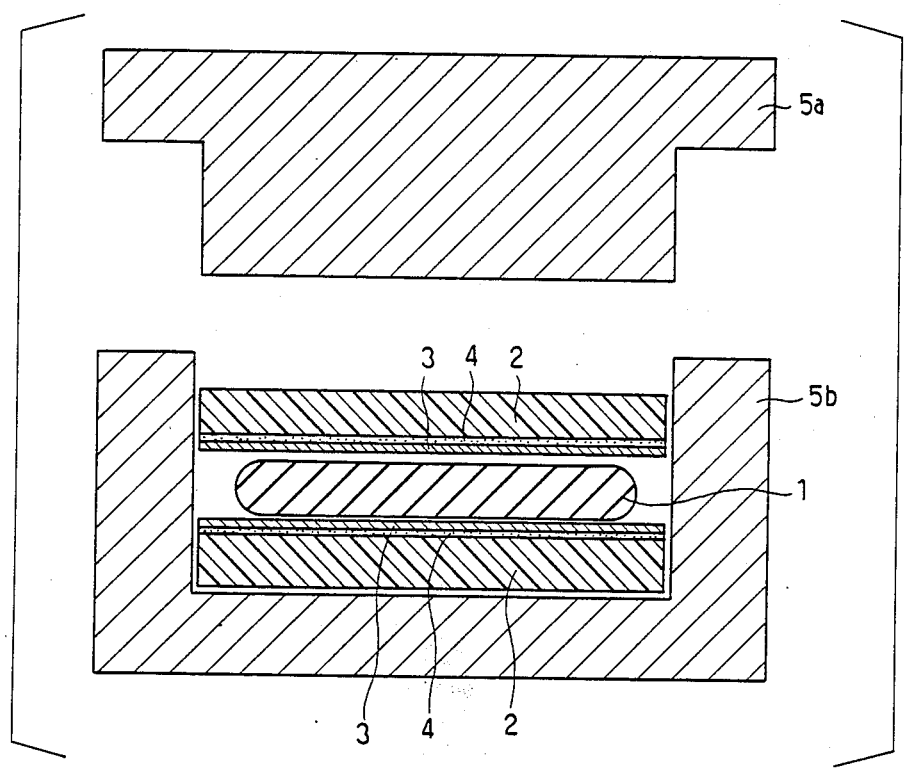

AIR-STREAM CONTROL VALVE FOR AUTOMOTIVE AIR CONDITIONING APPARATUS AND PRODUCING METHOD THEREFOR

FIELD OF TECHNOLOGY

The present invention relates to an air-stream control valve made of synthetic resin to be used for automative air conditioning apparatuses and the producing method therefor. More particularly, an air-stream control valve of new construction is described having a unitary soft foam sheet is firmly fixed to one side or both sides of the valve body, as well as a specific method to produce this control valve efficiently.

BACKGROUND TECHNOLOGY

In air-stream control valves for automotive air conditioning apparatuses, a soft foam sheet 2 such as polyurethane foam or a soft material made of rubber etc. (a kind of packing) is adhered to the valve body 1 to attenuate the noises to be generated when it hits the case and to prevent the air leakage from the gap between the valve and the case (see FIG. 2). As a producing method of these valves, such methods as that the valve body is produced first, and then the foam sheet above is adhered to it by an adhesive 4 or that the foam forming for the foam layer itself is conducted on the valve body have been adopted. However, the foam sheet adhesion method takes time and shows poor adhesion strength. Further the latter method has a drawback that the foram forming on the valve body also takes much time. On the other hand, although vavle bodies were made of iron sheet in previous time, they have been gradually switched to a synthetic resin in consideration of weights and costs, and especially ABS has been well adopted. However, it also has a drawback of low rigidity.

Therefore, it is better to select a high rigidity material such as polypropylene as the valve body, however if made so, the contact between the valve body and the foam sheet becomes especially poor, tending to peel off, which becomes a new problem.

SUMMARY OF THE INVENTION

In the conventional technology where the valve body is first produced, there are drawbacks as discussed above, which comes to another method where the foam sheet is first produced and thereafter the valve body is unitedly formed together. However this latter method has not been considered seriously so far because of the following reasons. In integral molding, the synthetic resin for forming the valve body excessively permeates into the foam sheet, and thus the softness, elasticity and sealing performances of the sheet disappear, to result in an extreme case in meaninglessness of such a double structure.

The problems the present invention tries to solve reside in this point. As a results, the present inventors gave considerations to the improvement of this point, a new method where the syntehtic resin does not permeate excessively into the foam sheet when in integral molding is developed, and the present inventors succeeded in that the valve body and the foam sheet are firmly fixed together to obtain a superior air-stream control valve.

The air-stream control valve of the present invention is the one where a soft foam sheet is integrally adhered to the valve body of synthetic resin through a resin permeation preventing sheet disposed on one side or both sides of the valve body. The resin permeation preventing sheet is adhered by an adhesive to one side of the soft foam sheet in advance, and then on the resin permeation preventing sheet disposed on the foam sheet is disposed the synthetic resin to form the valve body, or, on the synthetic resin for forming the valve body another form sheet with the resin permeation preventing sheet is disposed in such a manner that the resin permeation preventing sheet faces with the valve body, thereafter the stamping formation process is applied.

As the synthetic resin for forming the valve body, thermoplastic materials such as polypropylene, polyethylene, polysthyrene, ABS, acrylic resin or nylon can be widely usable, and the present method is especially effective for polypropylene which is generally of high rigidity but is poor adhesiveness.

Even if the glass fibers, talc, mica or the like are contained as the filling agent in the synthetic resin for the valve body, the method of the present invention is still usable. Especially as to the glass fibers, if a sheet material made of polypropylene resin with the long fiber mat is used, it is effective since the material is easily adhered to the foam sheet only by heating-up in the furnace.

As the soft foam sheet, sheet materials made of polyurethane, polyethylene, polysthyrene or the like are used.

As a resin permeation preventing sheet, Japanese paper, foreign paper, cloth, or synthetic resin film can be used as far as those materials receive the synthetic resin by themselves and prevent the permeation into the foam sheet.

A metallic die is used to do a stamping formation, however the processes before the stamping i.e. the processes prior to the deposition of the synthetic resin can be done outside of the dies.

BRIEF DESCRIPTION OF DRAWINGS

FIG. 3 is a cross-sectional view showing the soft foam sheet with the resin permeation preventing sheet to be used in the present invention, FIG. 4 is a cross-sectional view showing the producing method of the air-stream control valve of the present invention, the dies being open.

BEST MODE OF PRACTICING INVENTION

The processes of the method of the present invention are explained hereinwith reference to the drawings. As shown in FIG. 3, a soft foam sheet 2 which is glued with a resin permeation preventing sheet 3 such as Japanese paper by an adhesive 4 is prepared, this being made by continuous mass production, so that it can be prepared in advance at a low cost.

As shown in FIG. 4, the soft foam sheet 2 is disposed in the cavity of the metallic die (lower die) 5b with the resin permeation preventing sheet 3 up, and then the synthetic resin 1' with the filling agent which is softened is disposed on top of this soft foam sheet.

Figure 7:
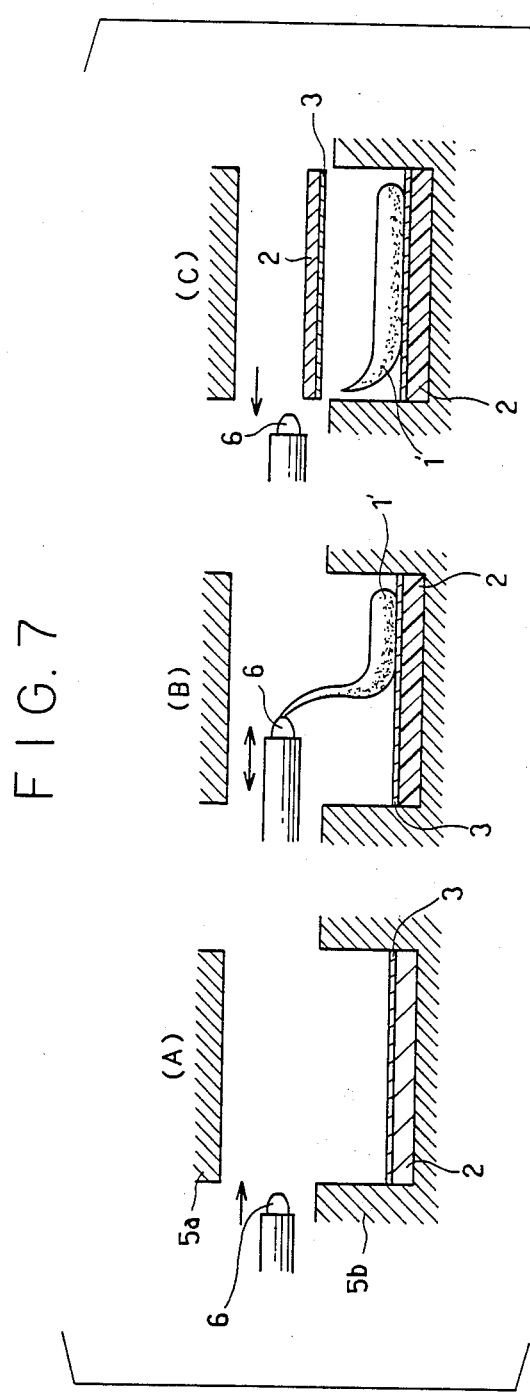
Figure 8:
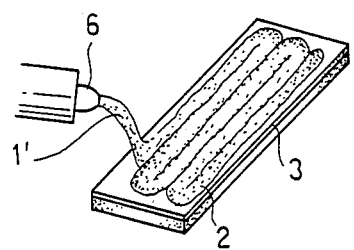
Figure 9:
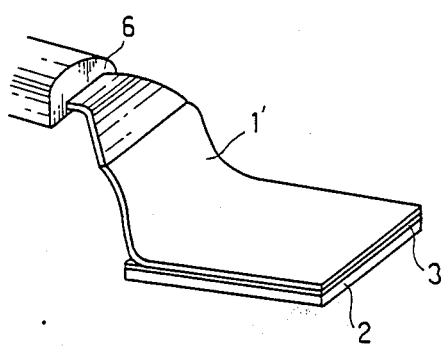

The supply of the synthetic resin 1' is accomplished by an extrusion nozzle 6 of an extruder which reciprocates several times above the metallic die (FIG. 7) or by extruding the resin in sheet shape, or any other pertinent methods. As another example where the synthetic resin is supplied to the soft foam sheet 2 outside of the dies, the synthetic resin can be supplied at a fixed location by an extruder to the soft foam sheet 2 on the conveyor belt coming continuously or intermittently. (FIGS. 8 and 9).

Figure 10:
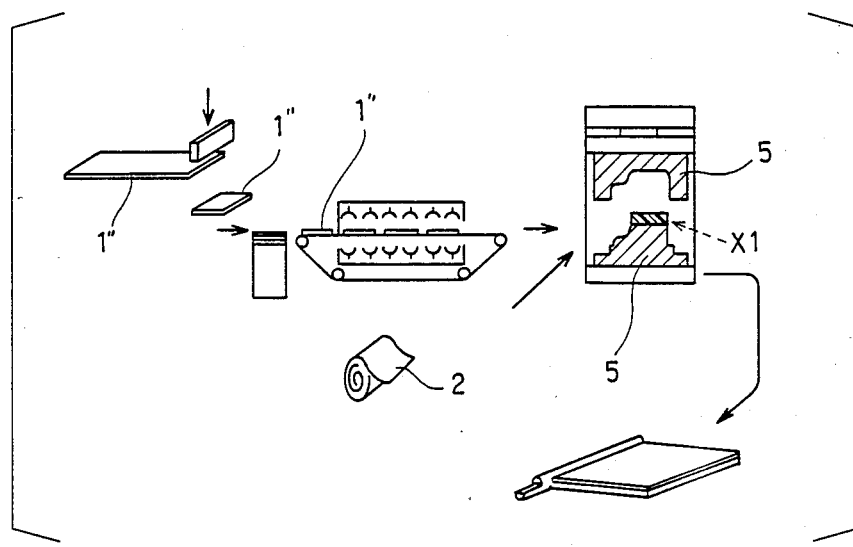
Figure 11:
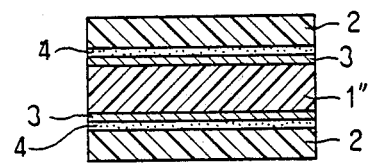

In the above, the disposition method of the softened synthetic resin is explained. However, if the resin is a sheet matrial 1'' made of polypropylene with long glass fiber mat which is produced in advance, it becomes possible to dispose this resin on the soft foam sheet 2 in advance, and to thereafter locate the combined sheets into the dies. Thus, the operation becomes simpler. In this case, however, it is better for the sheet 1'' with the long glass fiber mat to pass through a heat-up furnace beforehand and then be disposed on the soft foam sheet, or to set on the die to be sandwiched by the two sheets. (FIGS. 10 and 11)

Figure 1:
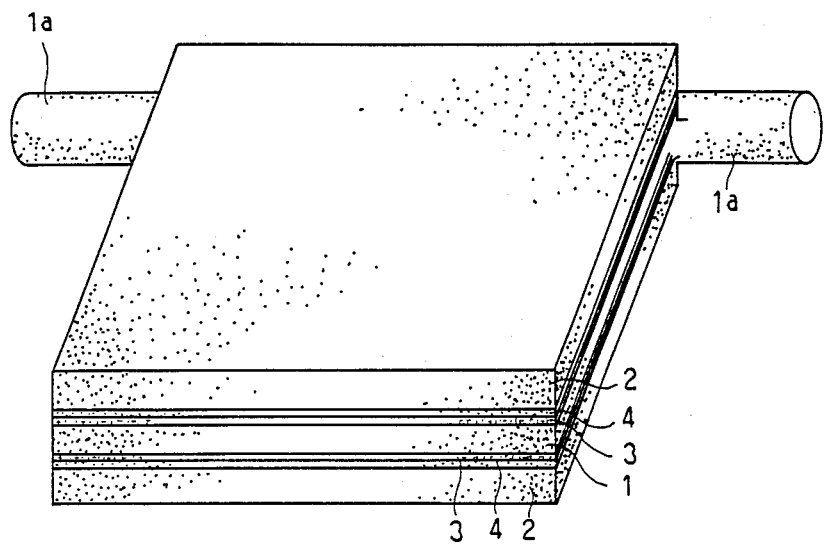
FIG. 1 is a perspective view showing the air-stream control valve of the present invention.
Figure 2:
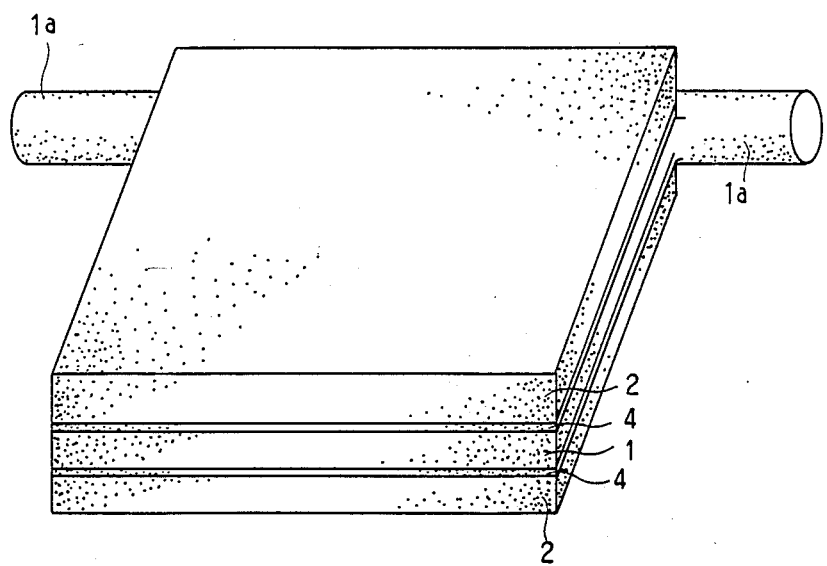
FIG. 2 is a perspective view showing the air-steam control valve of the conventional type.
Figure 5:
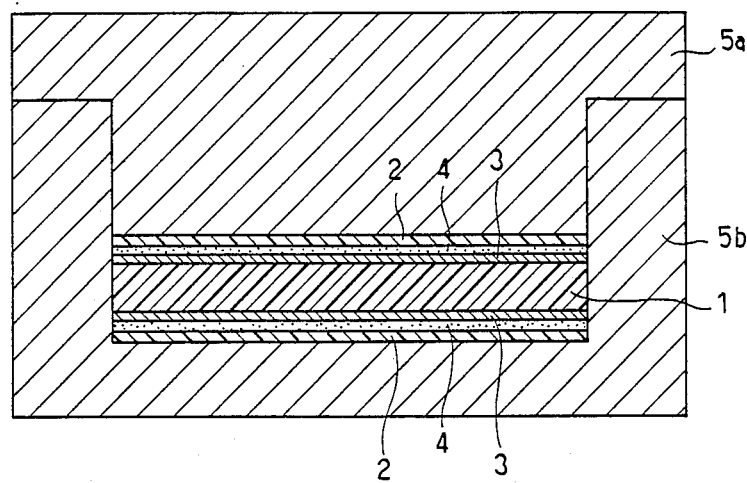
FIG. 5 is a cross-sectional view showing the producing method of the air-stream control valve of the present invention, the dies being closed, FIGS. 6 ((A), (B), (C)) is a cross-sectional view showing the process of producing the air-stream control valve with a shaft according to the present invention (processes are in the order of (A), (B), and (C)), FIGS. 7 ((A), (B), (C) is a process chart showing the steps to feed the synthetic resin onto the dies ((A): prior to feeding, (B): feeding, (C): after feeding), FIGS. 8 and 9 are illustrations showing the steps of feeding the synthetic resin outside the dies, FIG. 10 is a process chart utilizing a sheet of synthetic resin with long glass fiber mat according to the present invention, and FIG. 11 is an enlarged view of the portion XI indicated in FIG. 10.

The next step is die closing and stamping. At this time the soft foam sheet 2 is squashed by the force applied. However, the product with the shaft 1a unitary with it is well formed. The processes are indicated in FIGS. 4 to 6 and FIG. 10. After the stamping formation, the soft foam sheet 2 resumes its initial condition to be a product shown in FIG. 1. Further, when the shaft is a separate part from the valve body, the construction of the dies and the operation thereof become simpler. When ribs are required for the valve, it is preferable to provide grooves 5c for ribs in the lower die 5b as shown in broken line in FIG. 6 in the steps shown in FIGS. 6 ((B), (C)). In this case the synthetic resin 1' brakes the soft foam sheet 2 and the resin permeation preventing sheet 3 to be filled in grooves 5c, resulting a valve with ribs.

The temperature at the stamping formation is between 150° C.–240° C. in case of polypropylene, although it differs according to the kind of synthetic resin and the degree of preheating.

At the stamping formation, the resin permeation preventing sheet 3 of Japanese paper prevents the synthetic resin from permeating into the soft foam sheet 2, and the sheet 3 receives a portion of the synthetic resin permeated thereinto, thereby to obtain a firm connection. In case of other sheets which exhibit poor permeation, other materials than Japanese paper, it is possible to provide small holes in these sheets in advance to obtain a firm connection, controlling the permeation of the synthetic resin into the sheet as required. However, in this case, it is necessary to consider sufficiently the elasticity of the foam sheet 2 and the shock absorbing characteristic thereof.

The explanation above is for valve body 1 of synthesin resin which has the soft foam sheet 2 on both sides, however the same applies to the one which has the sheet 2 on one side only. Further, it is possible to apply this method to the one which has the sheet 2 partially, or the one which has concave or convex portions according to the same principle if the dies are changed as required.

EXAMPLES

The examples of the present invention are as follows.

Example 1

Figure 6:
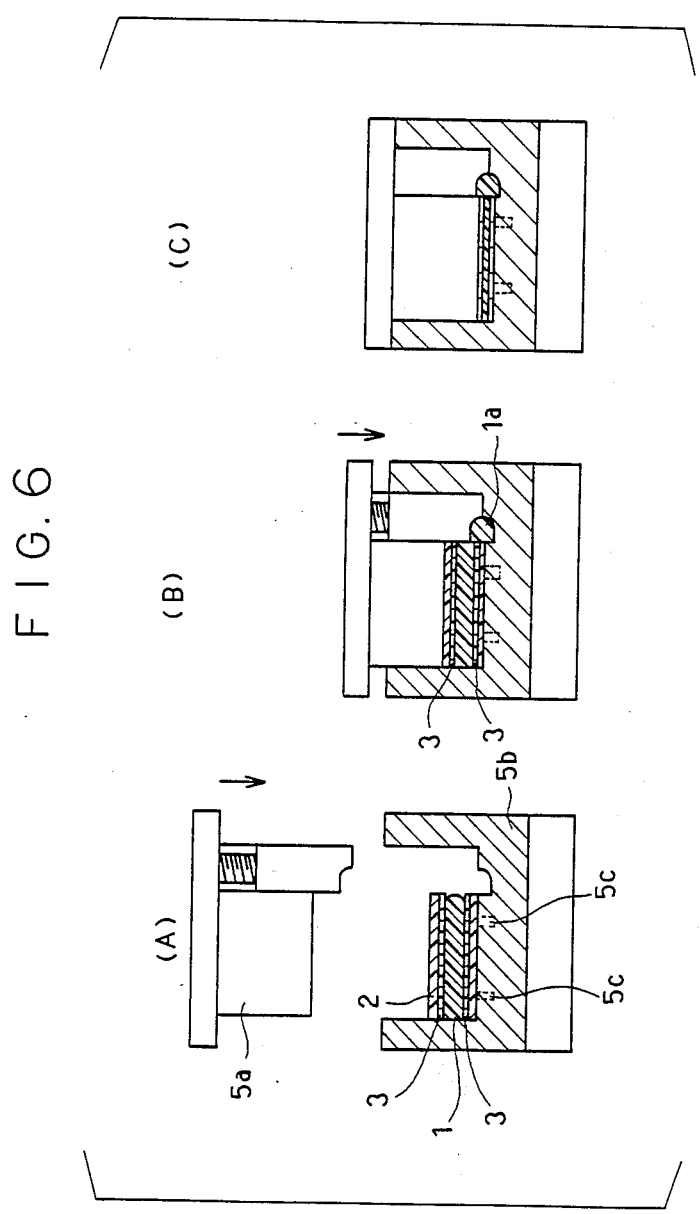

A soft polyurethane of 8 mm thick, 98 mm long and 280 mm wide with a Japanese paper of 0.05 mm thick adhered to one side thereof is disposed in the metallic die (lower die) with the Japanese paper up, the synthetic resin of polypropylene including 40% mica is extruded from the nozzle of the extruder, and the same soft polyurethane foam sheet with the Japanese paper is disposed with the Japanese paper down. The material is then stamp-formed with the pressure of 220 Kg/cm$^2$ (die temperature 30° C.) as shown in FIG. 6, cooled down and rigidified, thus obtaining an air-stream control valve with the polyurethane sheet on both sides thereof.

EXAMPLE 2

The polypropylene synthetic resin including 40% mica in example 1 is substituted for polypropylene synthetic resin including 40% glass fibers to glue under the same proces, then obtaining another air-stream control valve with the polyurethane sheet on both sides thereof.

Example 3

The soft polyurethane foam sheet with the Japanese paper in example is disposed in the lower die of the metallic dies in advance, on the material polypropylene synthetic resin sheet (trade name AZDEL) which contains long glass fiber mat is disposed, and then the same soft polyurethane foam sheet with the Japanese paper is disposed with the Japanese paper down. The polypropylene sheet is cut down in the same dimension as in Example 1, i.e. 98 mm long and 280 wide to be put on conveyor belt and preheated in the heat-up furnace in advance. The stamping formation is applied to the materials arranged above with the pressure of 220 Kg/cm$^2$ and the die temperature of 30° C. to unify them, thus obtaining further air-stream control valve with polyurethane sheet firmly secured to both sides.

The values of physical characteristics of the air-stream control valves obtained (especially the portion of the valve body) are as follows.

|  | Example 1 with mica 40% (P.P.) | Example 2 with glass fiber 40% (P.P.) | Example 3 with long glass fiber (AZDEL) |
|---|---|---|---|
| Tension |  |  |  |
| Stress at yield point (kg/cm$^2$) | 530 | 735 | 770 |
| Elongation at break point (%) | 3 | — | — |
| Bending |  |  |  |
| Modulas of elasticity (kg/cm$^2$) | 89.600 | 57.400 | 56.000 |

-continued

|  | Example 1 with mica 40% (P.P.) | Example 2 with glass fiber 40% (P.P.) | Example 3 with long glass fiber (AZDEL) |
|---|---|---|---|
| Strength (kg/cm$^2$) | 740 | 770 | 1.540 |
| IZOD impact value (kg/cm$^2$) | with notch 2.8 | 22 | 65 |
| Temperature of thermal deformation (°C.) | 18.6 kg/cm$^2$ 142 | 149 | 154 |
| Specific gravity | 1.25 | 1.22 | 1.19 |

Since the air-stream control valve of the present invention is constructed above, the resin permeation preventing sheet well supports the unification of the valve body synthetic resin and the soft foam sheet, and accomplishes the function of preventing the synthetic resin from permeating into the foam sheet, therefore as a result the foam sheet does not peel off from the valve body and the valve exhibits a sufficient shock absorbing characteristic in relation to the rigidity of the valve body, which is a superior effect of the present invention.

In the producing method of the present invention, it only utilizes a simple stamping formation method to obtain a superior air-stream control valve. Therefore, it is extremely usable in that a continuous operation is possible and that it is applicable widely to synthetic resins of polypropylene, polyethylene and the like which have sufficient rigidities but with poor adhesiveness.

INDUSTRIAL APPLICABILITY

The present invention is usable for an air-stream control valve (damper) made of synthetic resin for air conditioning apparatuses for automobiles. A soft foam sheet is firmly secured on one side or both side of the valve body, which makes it possible to obtain a superior air-stream control valve.

We claim:

1. A method for producing an air-stream control valve for an automotive air conditioning apparatus, comprising the steps of:
   preparing at least one soft foam sheet assembly including a soft foam sheet having a resin permeation preventing sheet adhered thereto;
   disposing a synthetic resin for forming a valve body on at least one resin permeation preventing sheet of said at least one soft foam sheet assembly; and
   stamp-forming the materials.

2. A method as in claim 1 wherein said synthetic resin is formed on said resin permeating preventing sheet, and said resin permeation preventing sheet allows a portion of said resin to permeate thereinto to achieve a good connection, but does not allow said resin to permeate therethrough, so that said soft foam sheet does not receive any resin permeating thereinto.

3. An air-stream control valve for an automotive air conditioning apparatus comprising:
   a soft foam sheet;
   a layer of resin permeation preventing means, adhered to said soft foam sheet; and
   a valve body, formed of synthetic resin integrally secured to said soft foam sheet through said layer of resin permeation preventing means by stamp-forming, wherein said resin permeation preventing means is for preventing resin permeation into said soft foam sheet.

4. An air-stream control valve for an automotive air conditioning apparatus according to claim 3, wherein:
   said valve body is made of a thermoplastic material from the group consisting of: polypropylene polyethylene, polysthyrene, ABS, acrylic resin and nylon.

5. An air-stream control valve for an automotive air conditioning apparatus according to claim 3, wherein:
   said valve body is made of a synthetic resin containing a filling agent from the group consisting of glass fibers, talcs, and mica.

6. An air-stream control valve for automotive air conditioning apparatus according to claim 3, wherein:
   said soft form sheet is made of a material from the group consisting of polyurethane, polyethylene and polysthylene.

7. An air-stream control valve for automotive air conditioning apparatus claimed in claim 3, wherein:
   said resin permeation preventing sheet is made of a material which receives the synthetic resin and prevents permeation into said soft form sheet.

8. An air-stream control valve for an automotive air conditioning apparatus claimed in claim 7, wherein:
   said resin permeation preventing sheet is made of a material from the group consisting of Japanese paper, paper, cloth and synthetic resin film.

9. A valve as in claim 3 wherein said resin permeating preventing means allows resin to permeate partially into said layer of resin permeating preventing means, but does not allow resin permeating through said layer of resin permeating preventing means so that resin does not enter said soft foam sheet.

* * * * *